(12) United States Patent
Mizutani

(10) Patent No.: US 8,134,739 B2
(45) Date of Patent: Mar. 13, 2012

(54) INFORMATION PROCESSING DEVICE FOR OUTPUTTING REDUCED-SIZE PAGES

(75) Inventor: Norio Mizutani, Mie-ken (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 518 days.

(21) Appl. No.: 11/726,789

(22) Filed: Mar. 23, 2007

(65) Prior Publication Data

US 2007/0223013 A1    Sep. 27, 2007

(30) Foreign Application Priority Data

Mar. 24, 2006    (JP) ................................ 2006-084261

(51) Int. Cl.
*G06K 15/00*    (2006.01)

(52) U.S. Cl. ......... 358/1.18; 358/1.9; 358/1.2; 358/528; 715/243; 715/246; 715/837; 715/838

(58) Field of Classification Search .................... 358/1.2, 358/1.9, 1.18, 527, 528, 540, 450, 451; 715/243, 715/246, 252, 273, 274, 837, 838; 345/629
See application file for complete search history.

(56) References Cited

U.S. PATENT DOCUMENTS

| | | | | |
|---|---|---|---|---|
| 5,765,176 A | * | 6/1998 | Bloomberg | 715/209 |
| 6,005,972 A | * | 12/1999 | Fredlund et al. | 382/176 |
| 6,188,490 B1 | * | 2/2001 | Miyake | 358/1.18 |
| 6,466,237 B1 | * | 10/2002 | Miyao et al. | 715/838 |
| 6,940,526 B2 | * | 9/2005 | Noda et al. | 345/629 |
| 2003/0020956 A1 | * | 1/2003 | Goel et al. | 358/1.18 |
| 2004/0201752 A1 | * | 10/2004 | Parulski et al. | 348/231.99 |
| 2007/0222802 A1 | | 9/2007 | Yoshida | |
| 2007/0226748 A1 | | 9/2007 | Mizutani | |

FOREIGN PATENT DOCUMENTS

| | | |
|---|---|---|
| JP | H5-153370 | 6/1993 |
| JP | H5-300343 | 11/1993 |
| JP | H7-148986 | 6/1995 |
| JP | H7-307859 | 11/1995 |
| JP | 2000-23104 | 1/2000 |
| JP | 2002-33904 | 1/2002 |
| JP | 2002-112004 | 4/2002 |
| JP | 2004-96688 | 3/2004 |
| JP | 2004-255729 | 9/2004 |
| JP | 2004-355230 | 12/2004 |
| JP | 2007-253572 | 10/2007 |
| JP | 2007-259353 | 10/2007 |

* cited by examiner

*Primary Examiner* — King Poon
*Assistant Examiner* — Jamares Q Washington
(74) *Attorney, Agent, or Firm* — Scully, Scott, Murphy & Presser, P.C.

(57) ABSTRACT

An information processing device includes an acquiring unit, a reducing unit, and an outputting unit. The acquiring unit acquires at least two files each including a page on which at least one of character and image is carried. The reducing unit generates a reduced-size page. If the file includes a plurality of pages, the reducing unit reduces size of the plurality of pages. The outputting unit outputs the plurality of reduced-size pages generated from at least two files.

18 Claims, 17 Drawing Sheets

DISPLAY FILE MANAGEMENT TABLE 37

| FILE NAME | PAGE NUMBER | DISPLAY ORDER |
|---|---|---|
| FILE 1 | 2 | 3 |
| FILE 2 | 1 | 1 |
| FILE 3 | 2 | 4 |
| FILE 4 | 1 | 2 |

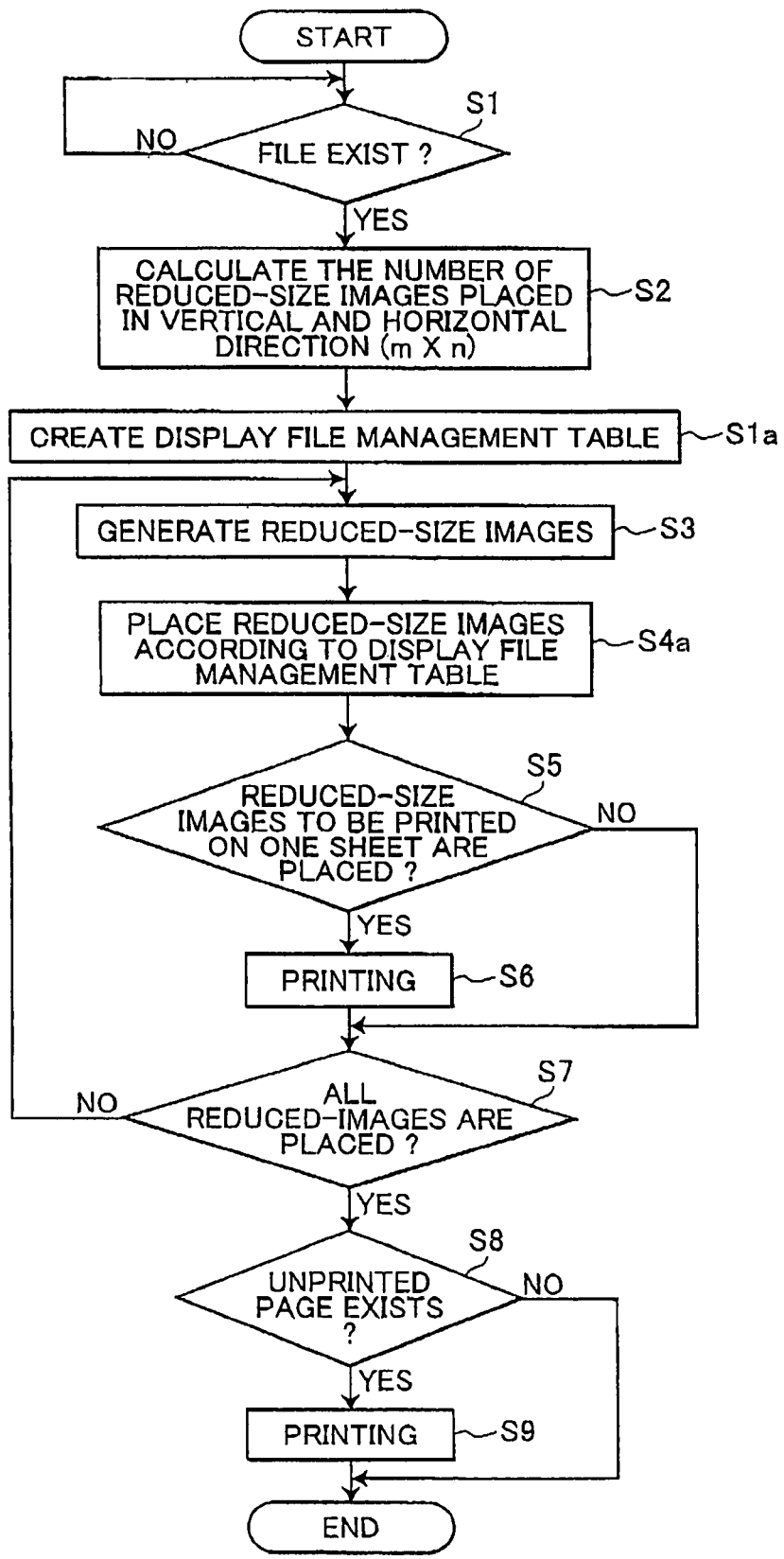

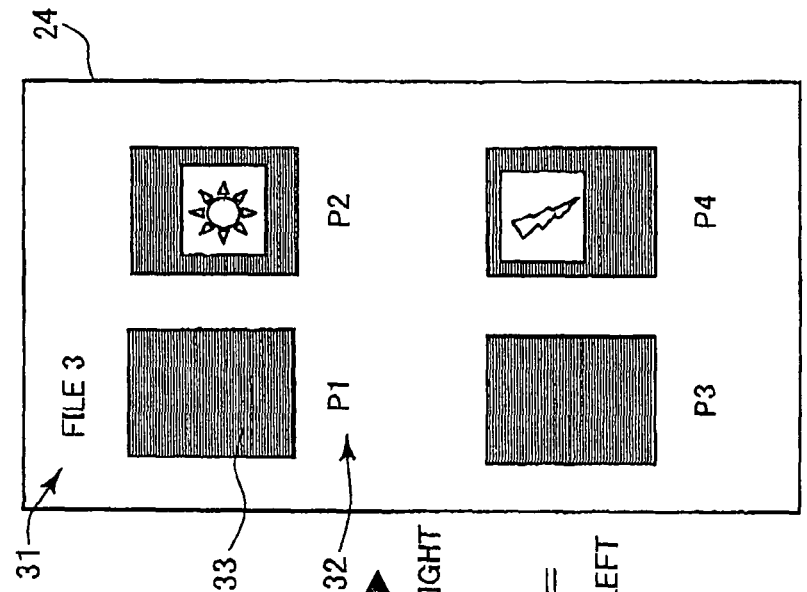
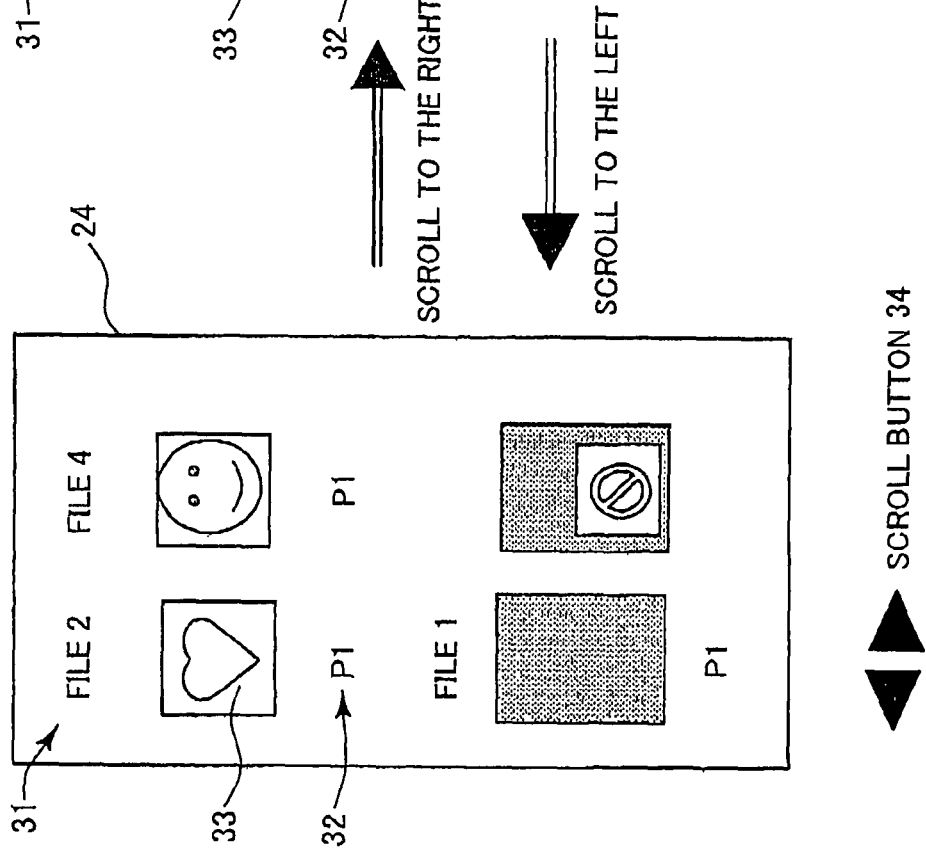

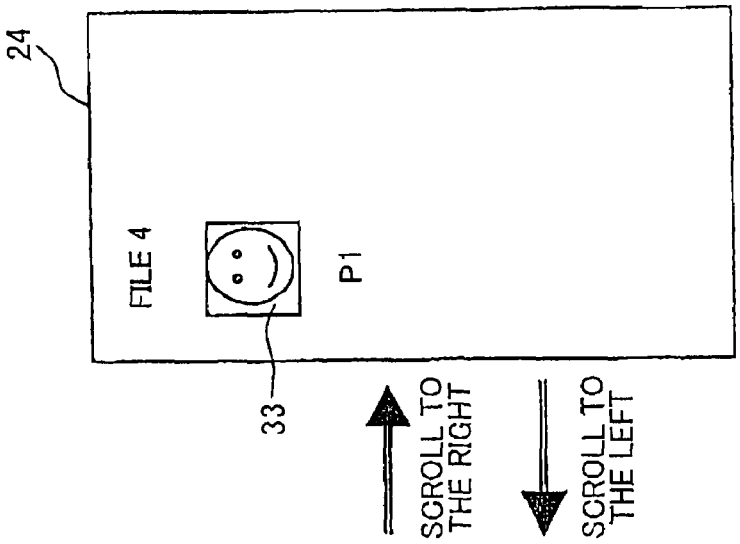
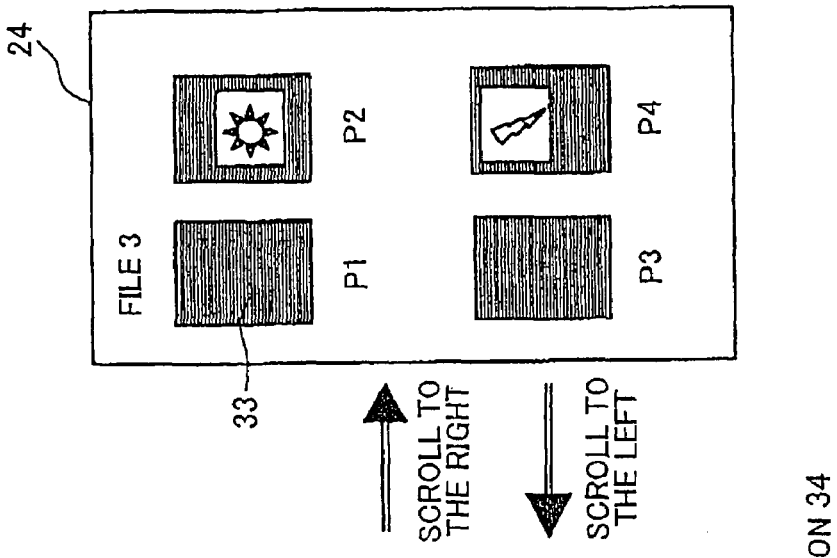
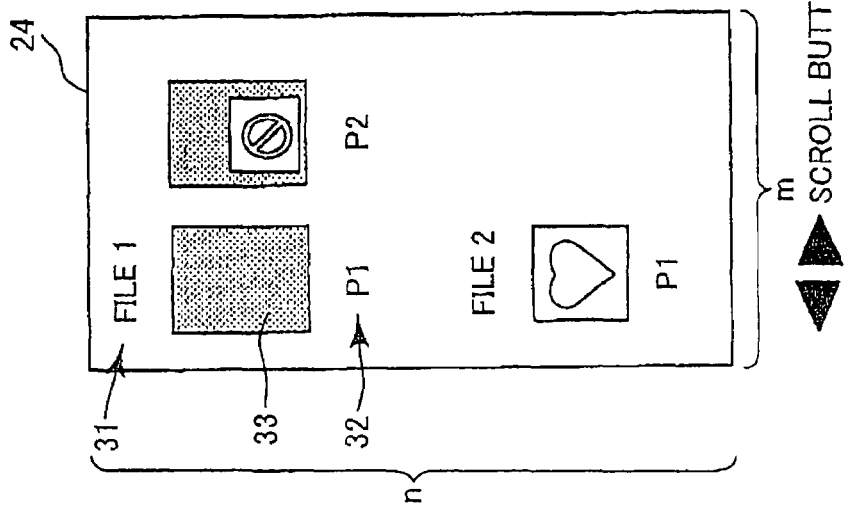

INFORMATION PROCESSING DEVICE FOR OUTPUTTING REDUCED-SIZE PAGES

CROSS REFERENCE TO RELATED APPLICATIONS

This application claims priority from Japanese Patent Application No. 2006-084261 filed Mar. 24, 2006. The entire content of priority application is incorporated herein by reference.

BACKGROUND OF THE INVENTION

1. Field of the Invention

The present invention relates to an information processing device.

2. Description of Related Art

In recent years, printers capable of printing electronic files stored in a removable medium without using an information terminal such as a computer (PC) have been developed. In such printers, by attaching the removable medium to such printer, the electronic files stored in the removable medium can be easily printed. The electronic files include not only bitmapped images taken by a digital still camera but also document files such as PDF files generated by PC.

In order to confirm the electronic files stored in the removable medium, such printer has an index printing function of placing and printing reduced-size images and electronic file names in the electronic files on a recording paper. Such printing device is disclosed in Japanese Patent Application Publication No. 2002-112004.

SUMMARY OF THE INVENTION

Aspects of the present invention relate to an information processing device having an output function which is easy to recognize contents of files.

In another aspect, the present invention provides an information processing device including an acquiring unit, a reducing unit, and an outputting unit. The acquiring unit acquires at least two files each including a page on which at least one of character and image is carried. The reducing unit generates a reduced-size page. If the file includes a plurality of pages, the reducing unit reduces size of the plurality of pages. The outputting unit outputs the plurality of reduced-size pages generated from at least two files.

BRIEF DESCRIPTION OF THE DRAWINGS

The above and other objects, features and advantages of the invention will become more apparent from reading the following description of the preferred embodiments taken in connection with the accompanying drawings in which:

FIG. 10 is a flow chart showing the case where the index printing shown in FIG. 9 is performed, FIG. 11 shows another example of index display, FIG. 14 shows another example of index display.

DETAILED DESCRIPTION OF THE PREFERRED EMBODIMENTS

Figure 1:
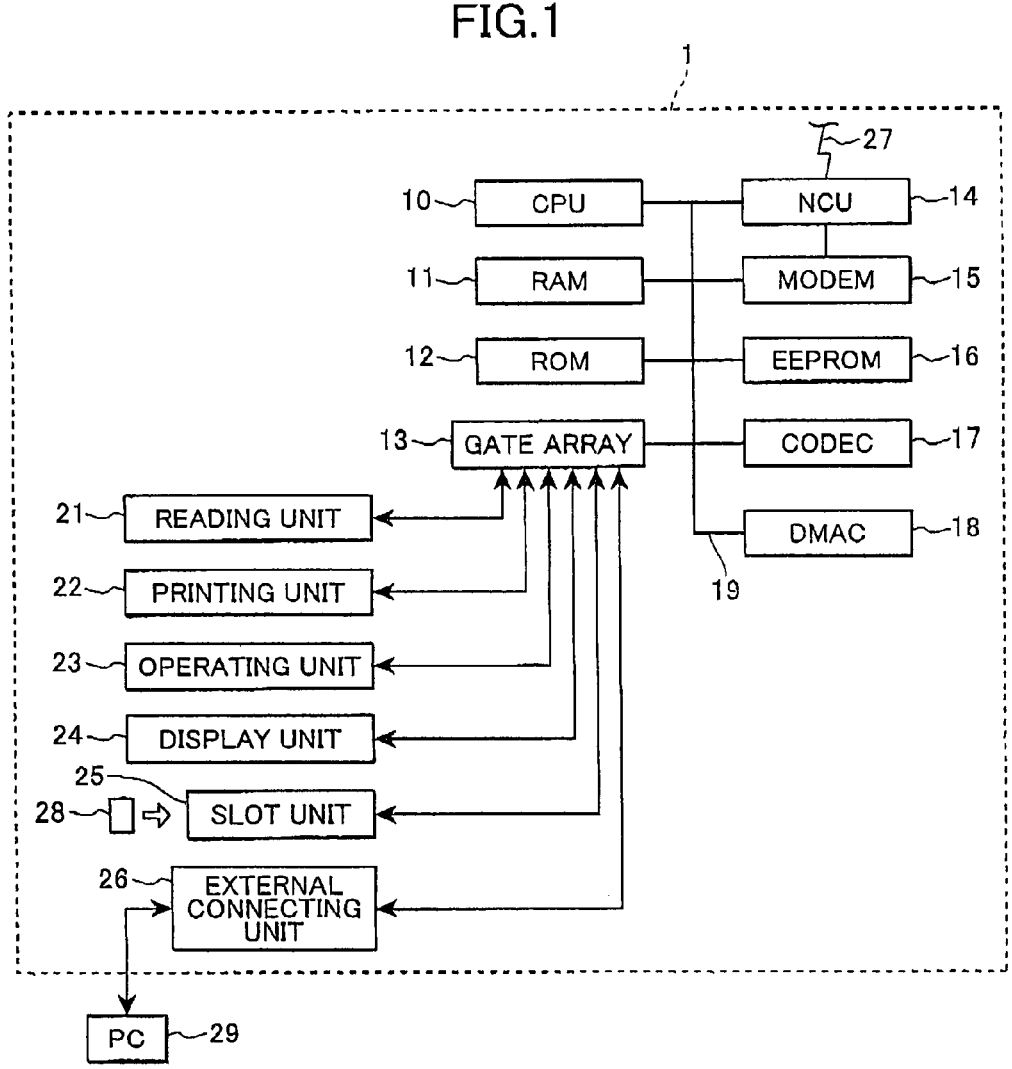
FIG. 1 is a block diagram of an example of a compound machine.

An information processing device according to preferred embodiments of the present invention will be described while referring to the accompanying drawings wherein like parts and components are designated by the same reference numerals to avoid duplicating description.

Embodiments of the present invention will be described with reference to figures. FIG. 1 is a block diagram of a compound machine as an example of an information processing device according to the present invention. The compound machine 1 has a faxing function, a copying function and a scanning function and includes a CPU 10, a RAM 11, a ROM 12, a gate array 13, an NCU (Network Control Unit) 14, a modem 15, an EEPROM 16, a codec 17 and a DMAC (Direct Memory Access Controller) 18. These elements are interconnected with a bus line 19. The bus line 19 includes an address bus, a data bus and a control signal line. A reading unit 21, a printing unit 22, an operating unit 23, a display unit 24, a slot unit 25 and an external connecting unit 26 are connected to the gate array 13. A telephone circuit 27 is connected to the NCU 14.

Figure 2:
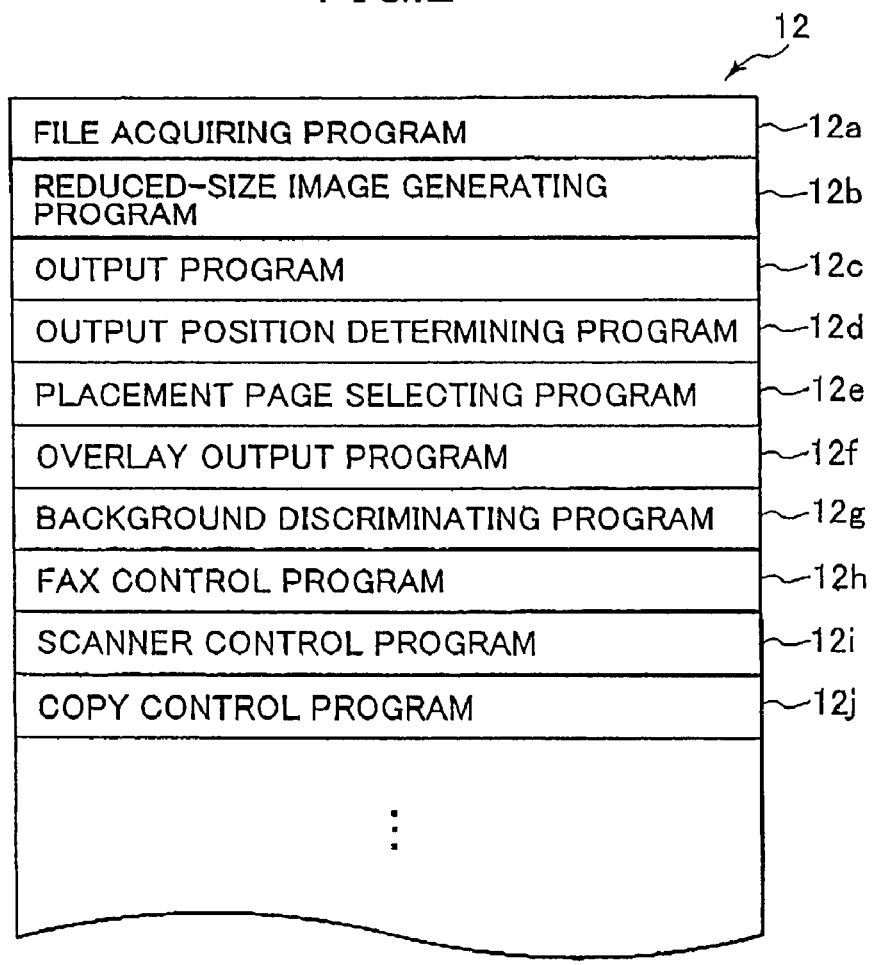
FIG. 2 shows an example of a program stored in a ROM.

The CPU 10 controls whole operation of the compound machine 1. As shown in FIG. 2, various programs including a file acquiring program 12a, a reduced-size image generating program 12b, an output program 12c, an output position determining program 12d, a placement page selecting program 12e, an overlay output program 12f, a background discriminating program 12g, a FAX control program 12h, a scanner control program 12i and a copy control program 12j are stored in the ROM 12.

The file acquiring program 12a is a program for acquiring a file stored in a storage medium 28 and a personal computer (PC) 29. The reduced-size image generating program 12b is a program for generating a plurality of reduced-size images corresponding to a plurality of pages contained in one file. The output program 12c is a program for printing the plurality of generated reduced-size images on a printing medium (paper) and displaying the images on the display unit 24. The output position determining program 12d is a program for separately positioning the reduced-size image of the file having only one page and the reduced-size images of the file having a plurality of pages for printing or displaying the reduced-size images. The placement page selecting program 12e is a program for selecting pages, reduced-size images of which are generated, so that the plurality of reduced-size images generated from one file may be placed to fit within the printing medium or a display region in a line in a predetermined direction. The overlay output program 12f is a program for correcting positional relation between the plurality of images so as to at least partially overlap with each other and printing or displaying the images. The background discriminating program 12g is a program for discriminating a background region and the other region of the reduced-size image placed on the lower side.

The FAX control program 12h, the scanner control program 12i and the copy control program 12j which are stored in the ROM 12 are programs for controlling the faxing function, the copying function and the scanning function, respectively.

The compound machine 1 is connected to the NCU 14. The NCU 14 is connected to the public telephone circuit 27 and controls (connects or disconnects) the circuit. The RAM 11 is used as a line buffer memory for an operating region of the CPU 10 and an expanding region of a read image. The modem 15 modulates and demodulates facsimile data. The ROM 12 stores various programs shown in FIG. 2 and data such as setting values therein. The EEPROM 16 stores various flags and setting information therein. The codec 17 codes and decodes facsimile data. The DMAC 18 mainly writes and reads data to and from the RAM 11.

The gate array 13 functions as an input/output interface between the CPU 10 and the units such as the reading unit 21. The reading unit 21 has an image sensor and an LED light source and reads images such as characters and drawing from a manuscript. The printing unit 22 prints the images such as characters and drawing according to an ink jet method or a laser method. The operating unit 23 has a key switch group formed of a ten key and letter keys and transmits an instruction corresponding to a key operation by the user to the CPU 10. The display unit 24 has a panel such as an LCD and displays an operation state, operation guidance and the reduced-size images thereon. The slot unit 25 has a connector for connecting various kinds of storage media 28 having a flash memory such as Smartmedia, Compact Flash (registered trademark), a USB memory therein and functions as a reader/writer for reading or writing data from or to the storage medium 28. The external connecting unit 26 has a connecting port which conforms to standards of centronics parallel interface or USB (Universal Serial Bus) and exchanges data and signals with the personal computer (PC) 29.

The compound machine 1 has a function of printing data as a peripheral device of the personal computer 29 and a so-called direct printing function of directly reading data from the storage medium 28, which is used in a digital camera and the like, inserted into the slot unit 25, and printing the data. As described later, the compound machine 1 outputs reduced-size images 33 of a print document file (for example, a file in pdf (portable document format) format) stored in the storage medium 28 together with a file name 31 and a page number 32 as index images. Similarly, the display unit 24 displays the reduced-size image 33 of the print document file together with a file name 31 and a page number 32 thereon.

Figure 3:
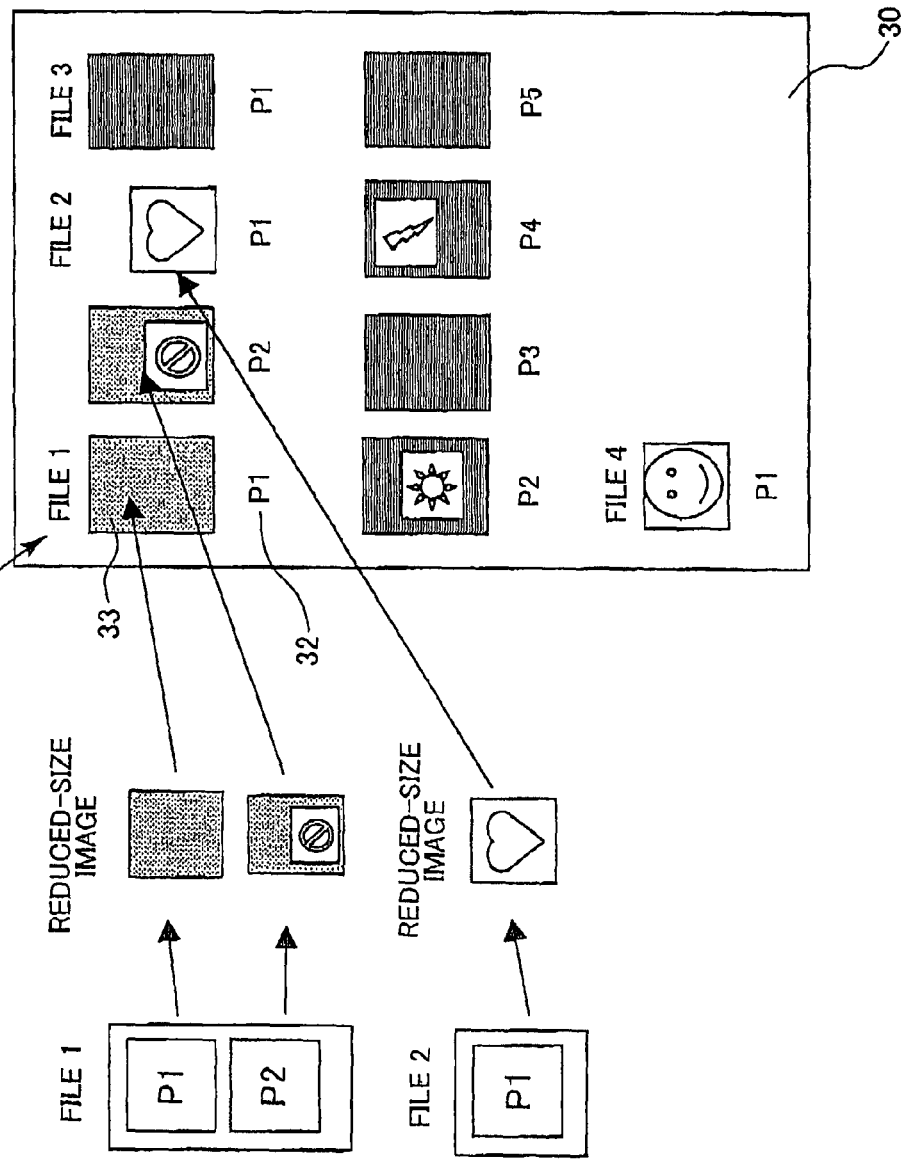
FIG. 3 shows an example of index printing.

FIG. 3 shows an example of index printing. In this example, the reduced-size images 33 of four files (file 1 to file 4) stored in the storage medium 28 are printed on a paper 30. The file 1 is formed of two pages, the file 2 is formed of one page, the file 3 is formed of five pages and the file 4 is formed of one page. The files 2 and 4 are bitmapped images such as JPEG and the files 1 and 3 contain a drawing and characters.

The reduced-size images 33 of all pages of these files are generated and the generated reduced-size images 33 are placed and printed at predetermined positions. The file name 31 is printed above each of the reduced-size images 33 and the page number 32 is printed below each of the reduced-size images 33. By performing the index printing in this manner, contents of the files stored in the storage medium 28 can be easily recognized. For example, since P1 of the file 1 contains only characters, it is difficult to recognize contents of the file. However, since P2 of the file 1 contains a drawing, the contents of the file can be immediately recognized. Similarly, although P1, P3 and P5 of the file 3 contain only characters, since P2 and P4 of the file 3 each contain a drawing, contents of the file can be easily recognized.

In this embodiment, a plurality of reduced-size images for each file is printed in this manner. If only the reduced-size image 33 of the leading page of each file is printed, it is difficult to recognize contents of the files 1 and 3 by looking at the reduced-size images 33 since P1 of the file 1 and P1 of the file 3 contain only characters. When a plurality of reduced-size images are printed as in this embodiment, the user can look at the reduced-size image of the page containing a drawing and thus, contents of the files can be easily grasped.

The display order of the file 1 to the file 4 may be the order of the Japanese syllabary or the order of file generation date. The file name 31 can be arbitrarily given by the file generator.

Figure 4:
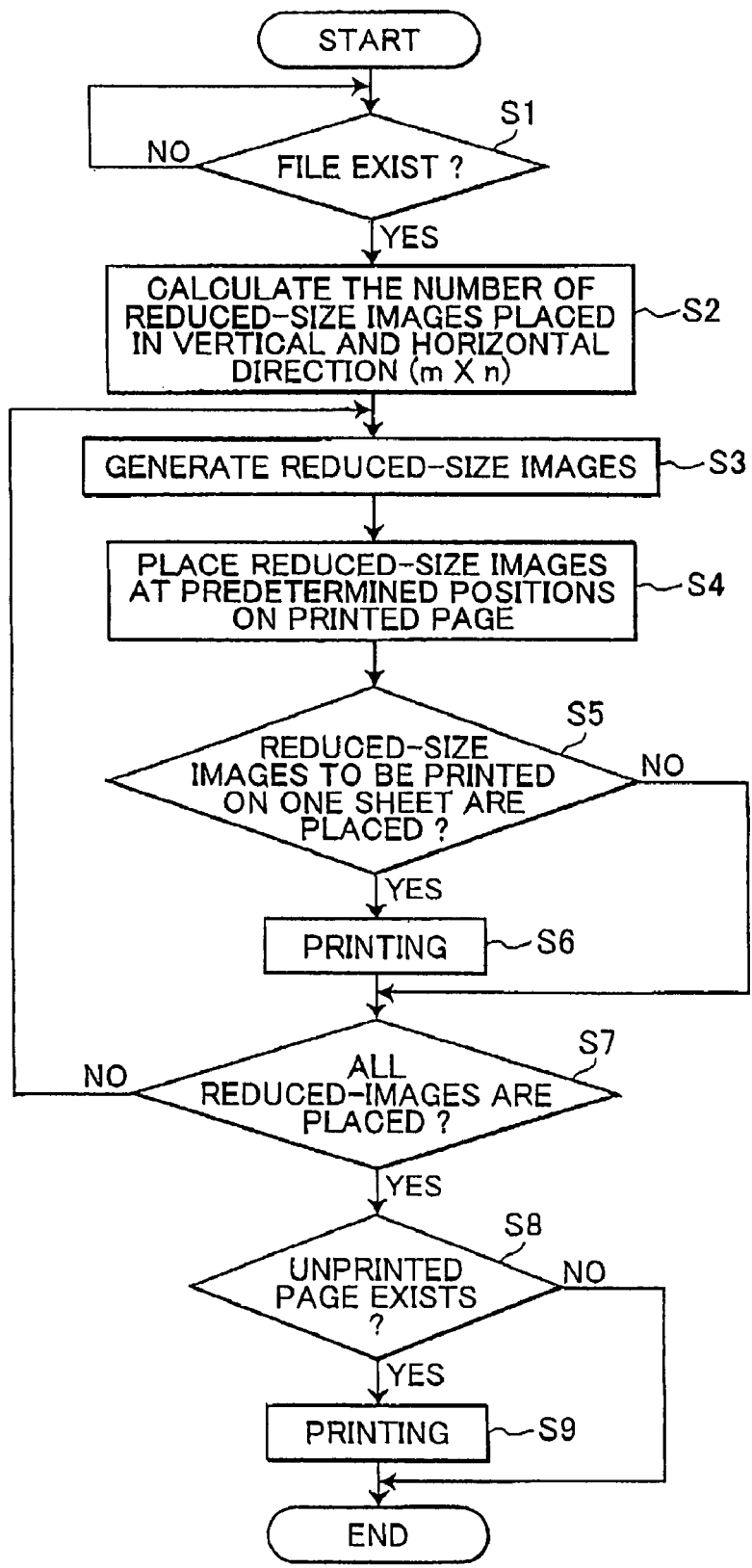
FIG. 4 is a flow chart showing the case where the index printing shown in FIG. 3 is performed.

FIG. 4 shows a flow chart for performing the index printing shown in FIG. 3. When the user performs an input operation for performing the index printing, the flow chart is started. At S1, it is determined whether or not there exist files. In the case of No at S1, the procedure returns to S1. In the case of Yes at S1, the number of the reduced-size images 33 to be placed on one sheet of the paper 30 or the plurality of paper 30 in the vertical and horizontal directions is calculated on the basis of the size of the paper 30 and the reduced-size image 33 at S2.

Then, at S3, the reduced-size image 33 corresponding to the page contained in the file is generated by the reduced-size image generating program 12b. At S4, the generated reduced-size image 33 is placed at predetermined positions on the paper 30. Then, at S5, it is determined whether or not all of the reduced-size images 33 to be printed on one sheet of the paper 30 have been placed. In the case of Yes at S5, the reduced-size images for the paper 30 are printed on the paper 30 at S6. Then, at S7, it is determined whether or not all of the reduced-size images 33 contained in all of the files have been placed on the corresponding paper 30. In the cases of No at S5, the procedure also proceeds to S7 without performing printing at S6. In the case of No at S7, the procedure proceeds to S3 for placing all of the reduced-size images 33 contained in all of the files on the corresponding papers 30.

By performing the processes of S3 to S7, the reduced-size images 33 corresponding to the pages contained in one file are sequentially placed on one sheet of the paper 30. For example, as shown in FIG. 3, the reduced-size images 33 are placed from the upper left of the paper 30 sequentially. If all of the reduced-size images 33 corresponding to all of the pages contained in one file have been placed on the paper 30, the same processing is performed for a next file. Then, after the sheet 30 has been filled with the reduced-size images 33, the reduced-size images 33 placed on the paper 30 are printed on the paper 30 by the output program 12c.

Here, the last paper 30 may not have been filled with the reduced-size images 33 even if all of the reduced-size images 33 contained in all of the files have been placed on the papers 30. In such a case, the reduced-size images 33 placed on the last paper 30 are not printed at S6 since the last paper 30 has not been filled with the reduced-size images 33. Therefore, in the case of Yes at S7, it is determined whether or not there exists an unprinted paper 30, that is, whether or not there exists any reduced-size image 33 that has not been printed. In the case of Yes at S8, the unprinted reduced-size images 33 are printed at S9, and then the procedure is finished. In the case of No at S8, the procedure is finished without performing printing at S9.

Figure 5:
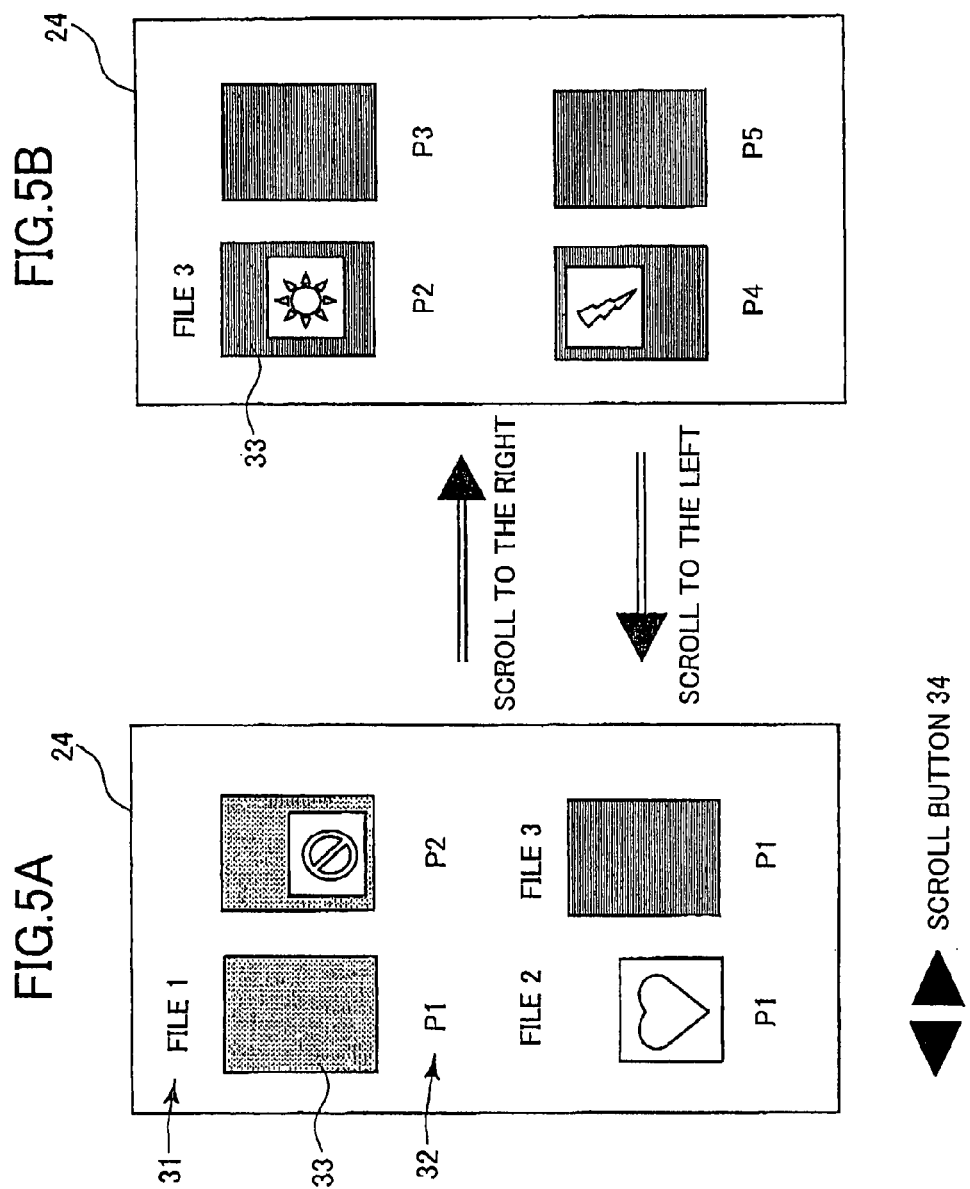
FIG. 5 shows an example of index display.

Next, FIG. 5A shows an example of the index display. As shown in this figure, a plurality of reduced-size images 33 contained in one file are placed and displayed on the display unit 24. For example, in the first screen, four reduced-size images 33 of P1 and P2 of the file 1, P1 of the file 2 and P1 of the file 3 are displayed. In this embodiment, the display unit 24 is made smaller than the paper 30. Thus, if the reduced-size images 33 are displayed in the same manner as in FIG. 3, since each of the reduced-size images 33 becomes too small, it is hard to see each of the reduced-size images 33. For this reason, the reduced-size images 33 are displayed as shown in FIG. 5A.

When a scroll button 34 is pressed to the right in the state as shown in FIG. 5A, the screen moves to the state shown in FIG. 5B and subsequent pages (P2 to P5) of the file 3 are displayed. When the scroll button 34 is pressed to the left, the screen returns to the state shown in FIG. 5A.

Figure 6:
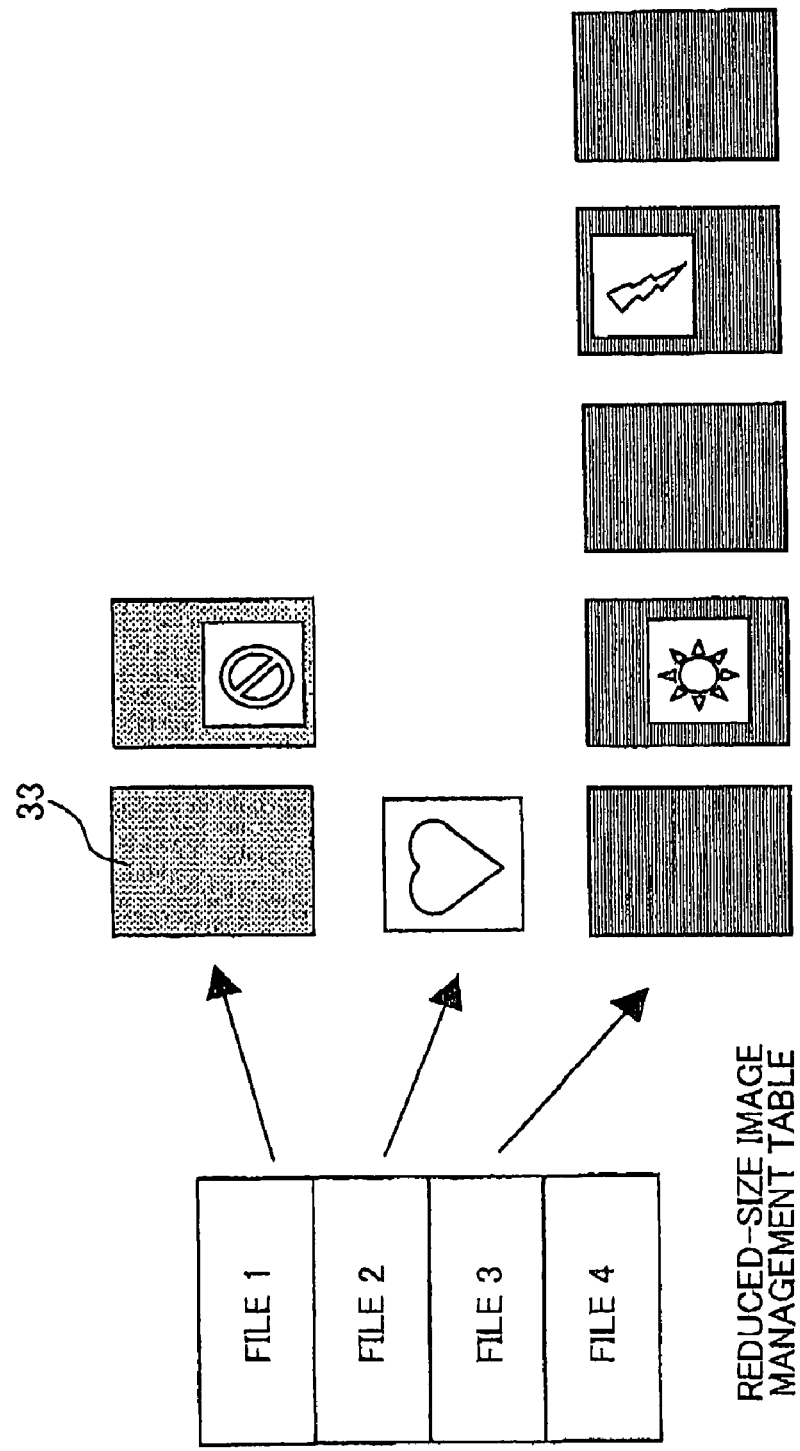
FIG. 6 is a view showing relation between files and reduced-size images.

The reduced-size images 33 in FIG. 5B may be generated after the scroll button 34 is pressed. However, for speed-up of display, it is desirable that all reduced-size images 33 in the file to be displayed are generated and stored at the same time when the page shown in FIG. 5A is displayed. For example, as shown in FIG. 6, the reduced-size images 33 of all pages of the files 1 to 3 to be displayed are generated and stored at the same time when the page shown in FIG. 5A is displayed. The images of pages up to P1 of the file 3 only need to be generated to display the page shown in FIG. 5A. However, if the reduced-size images 33 of the P2 to P5 of the file 3 are generated in displaying the page shown in FIG. 5B, it takes time to display the images. Thus, all of the reduced-size images 33 are previously generated.

Figure 7:
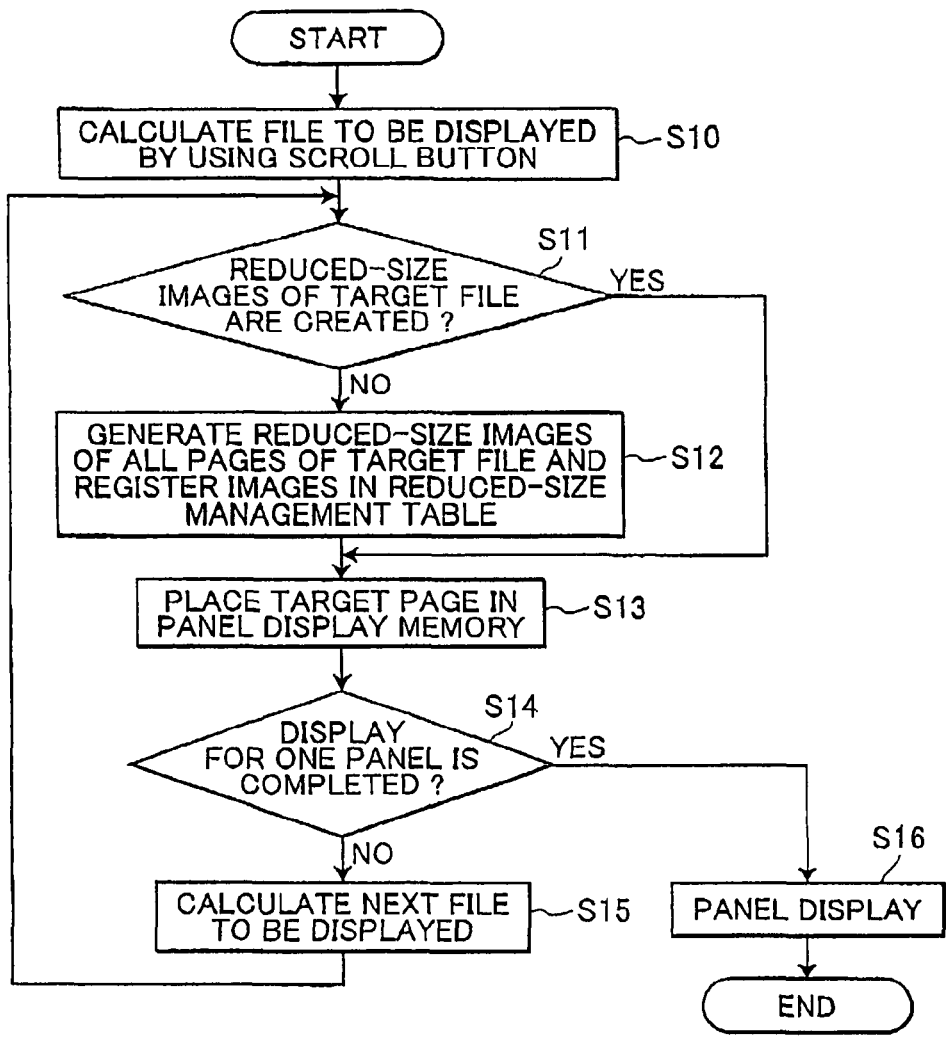
FIG. 7 is a flow chart showing the case where the index display shown in FIG. 5 is performed.

FIG. 7 shows a flow chart. First, at S10, by detecting pressing of the scroll button 34, the file to be displayed is calculated. That is, since the displayed file changes according to the operation of the scroll button 34 as shown in FIG. 5A to FIG. 5B, the file to be displayed is calculated. The first screen may be displayed by pressing a button other than the scroll button. At the time when processing at S10 is performed, the page number contained in the file is unclear. Accordingly, there may be a case where a plurality of files needs to be displayed on the panel at the same time. However, first, one file is selected. Note that it may be determined whether or not there exist files as FIG. 4.

Then, at S11, it is determined whether or not the reduced-size images 33 of the target file have been generated. In the case of No at S1, the reduced-size images 33 of all pages of the target file are generated by the reduced-size image generating program 12c, and the generated reduced-size images 33 are registered in a reduced-size image management table (a part of a storage area of the RAM 11) at S12. Though the reduced-size image 33 is generated one by one in FIG. 4, the reduced-size images 33 contained in a file are generated at a same time in FIG. 7. If storage capacity of the storage area of the RAM 11 is insufficient, unnecessary reduced-size images 33 may be deleted. Then, the procedure proceeds to S13. In the case of Yes at S11, the procedure also proceeds to S13.

At S13, target reduced-size images 33 are placed in a panel display memory. Then, it is determined whether or not the reduced-size images 33 to be displayed on the screen of the display unit 24 have been placed at S14. In the case of Yes at S14, the reduced-size images 33 are displayed on the display unit 24 by the output program 12c at S16. In the case of No at S14, a next file to be displayed on the screen of the display unit 24 is calculated at S15.

Through the above-mentioned processing, when the number of the pages contained in the file is small, the reduced-size images 33 are sequentially placed on the display unit 24 and when the number of the pages contained in the file is large, some of reduced-size images 33 are placed on the display unit 24 and remaining reduced-size images 33 are stored in the reduced-size image management table. When the scroll button 34 is pressed next time, the stored reduced-size image 33 is placed on the display unit 24. By doing so, since loads of the processing of generating the reduced-size image 33 when the scroll button 34 is pressed can be reduced, the index display can be achieved at high speed.

In FIG. 7, the reduced-size images 33 are generated from only the target file in consideration with the storage capacity of the storage area of the RAM 11. However, if there is sufficient storage capacity, the reduced-size images 33 of all pages of all files may be previously generated irrespective of the file to be displayed.

Further, though the reduced-size image 33 is generated one by one in FIG. 4 and the reduced-size images 33 contained in a file are generated at a same time in FIG. 7, the reduced-size image 33 may be generated one by one in FIG. 7 and the reduced-size images 33 contained in a file may be generated at a same time in FIG. 4.

Next, with reference to FIG. 8 to FIG. 10, another embodiment will be described. In this embodiment, reduced-size images of a file containing only one page and reduced-size images of a file containing a plurality of pages are separately printed. By printing the images in this manner, the user easily grasps contents of the files when looking at an index.

Figures 8, 9:
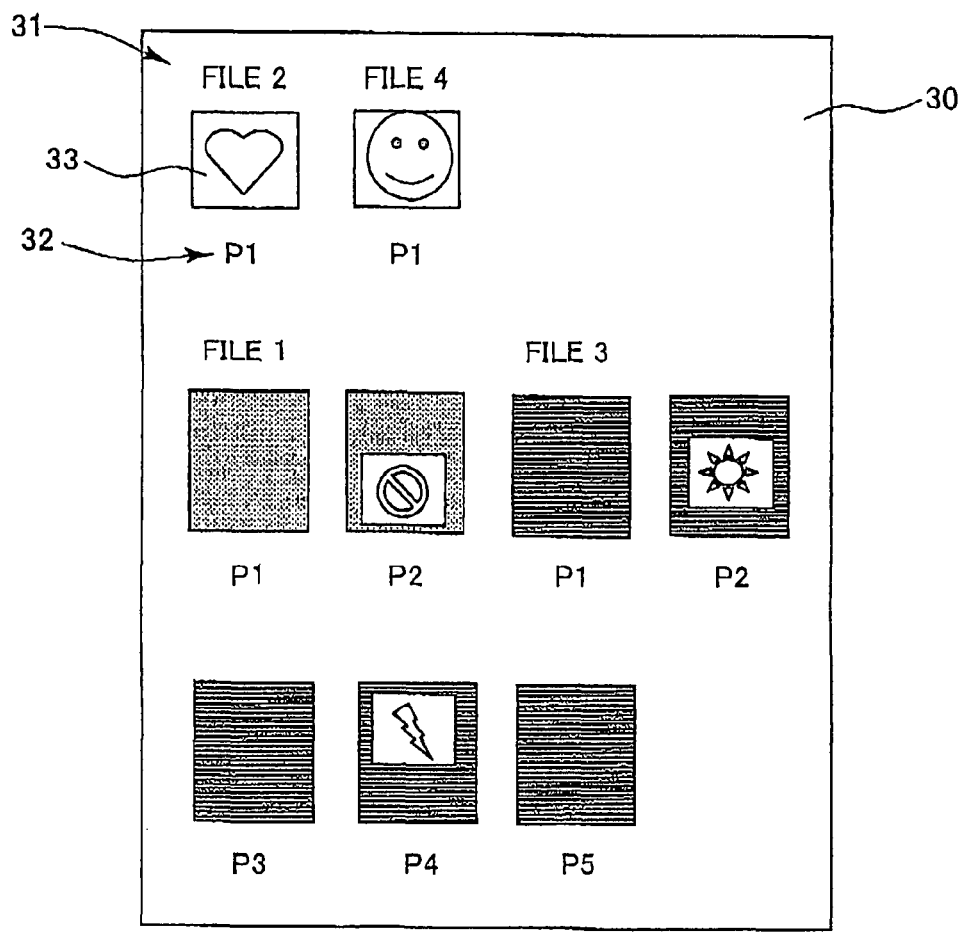
FIG. 8 shows an example of a display file management table.
FIG. 9 shows another example of index printing.

FIG. 8 shows an example of a display file management table for defining the order of files to be printed. The display file management table 37 uses a part of the storage area of the RAM 11. In the table, the file name 31 and the page number 35 of each file are associated with each other and stored. A display order 36 of each file is also defined and stored in the table 37. In this embodiment, the images of the files 2 and 4 which contain only one page are displayed first and the images of the files 1 and 3 which contain a plurality of pages are displayed next.

FIG. 9 shows an example of index printing according to the display file management table 37. As shown in this figure, first, the reduced-size images 33 of the files (files 2 and 4) which contain only one page are displayed first. Next, the reduced-size images 33 of the files (files 1 and 3) which contain a plurality of pages are displayed. Since the files are displayed in an orderly manner, the user can easily grasp contents of each file.

In this embodiment, a line feed is performed after the last file (file 4) of the files which contain only one page is displayed. Thus, it is easy to discriminate between the files which contain only one page and the files which contain a plurality of pages.

Though the files which contain only one page are first displayed together in FIG. 9, such the files may be displayed later.

FIG. 10 shows a flow chart of the index printing shown in FIG. 9. The same steps as those in FIG. 4 are given the same reference numerals and description thereof is omitted. In this flow chart, following the processing at S2 (the number of the reduced-size images placed in the vertical and horizontal directions is calculated), the display file management table 37 is generated by the output position determining program 12d at S2a. At this time, the type of each of files is identified to classify the files into files such as JPEG files which contain only one page and files such as PDF files which can contain a plurality of pages and determine the placement order of the files. At S4a, the reduced-size images 33 are placed according to the generated display file management table 37.

FIG. 11 shows an example of the index display. When the user performs an operation for the index display, first, the page shown in FIG. 11A is displayed. Here, the reduced-size images 33 of the files (file 2 and 4) which contain only one page are displayed first. Next, the reduced-size images 33 of the file (file 1) which contains a plurality of pages are displayed. When the scroll button 34 is pressed to the right, the screen moves to a state shown in FIG. 10B and the reduced-size images 33 of P1 to P4 of the file 3 are displayed.

Figure 12:
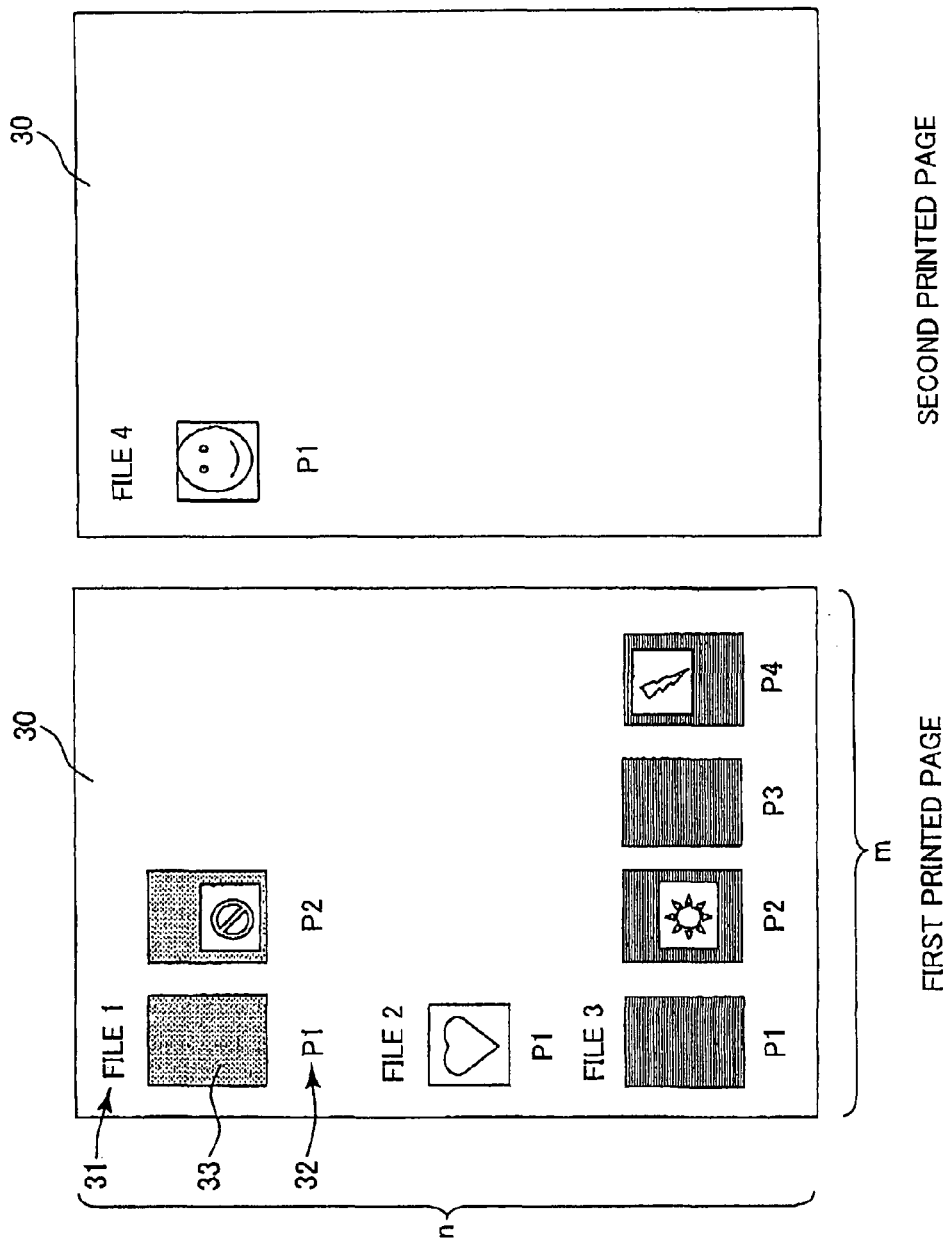
FIG. 12 shows another example of index printing.

Next, an example of the index display shown in FIG. 12 will be described. In FIG. 12, the reduced-size images 33 of one file are printed in line abreast by the number of page numbers (maximum number is m) so as to fall within the width of paper 30. That is, since m is 4 in the example in FIG. 12, the reduced-size images 33 of four pages P1 to P4 of the file 3 are printed and the reduced-size image 33 of p5 is not printed. Consequently, even when a lot of page numbers are contained in one file, a limited number of pages can be printed without printing all pages. For this reason, it is possible to prevent reduced-size images 33 more than necessary from being printed.

Although the reduced-size images 33 are placed in line abreast, the reduced-size images 33 may be placed in tandem.

Figure 13:
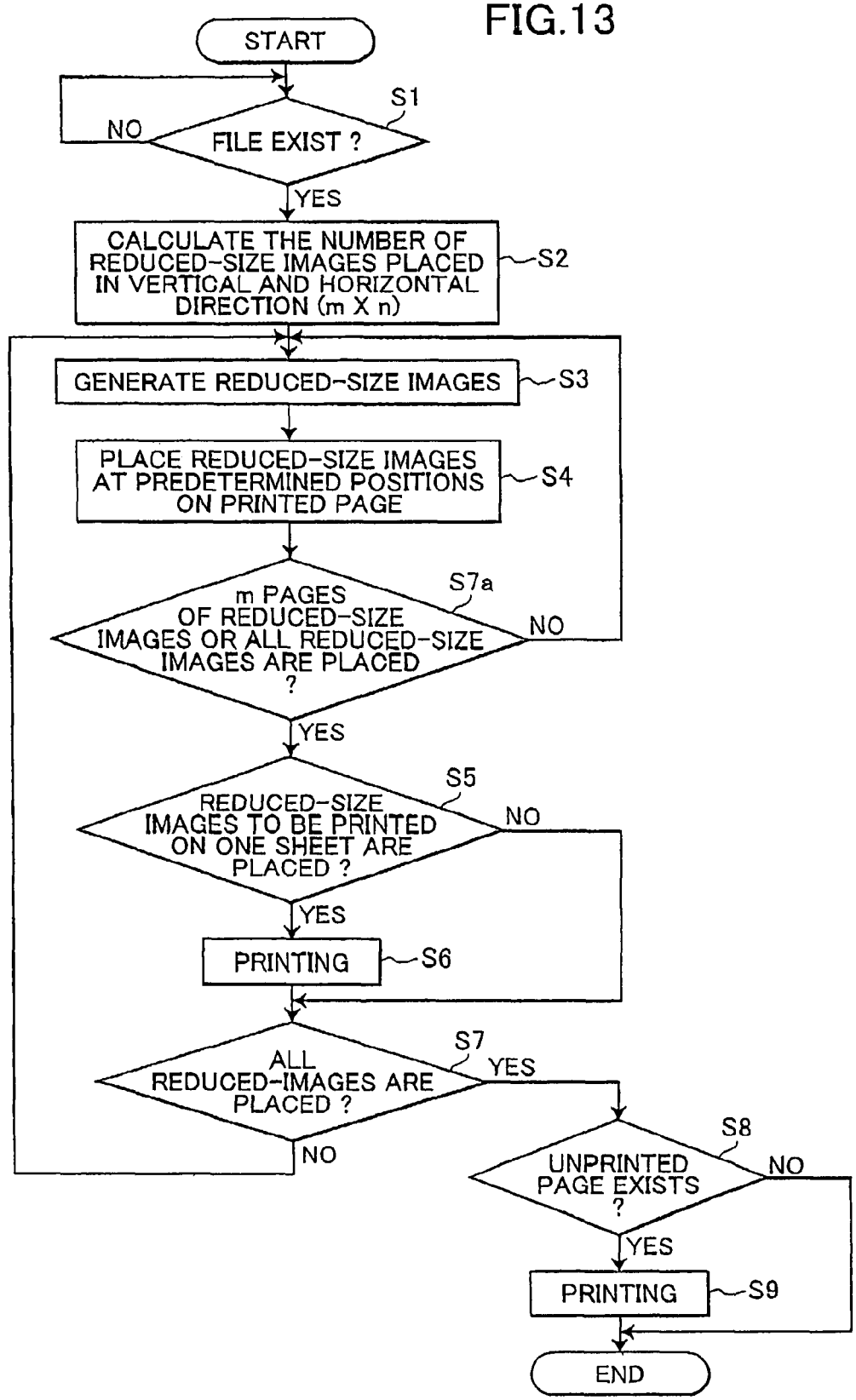
FIG. 13 is a flow chart showing the case where the index printing shown in FIG. 12 is performed.

FIG. 13 is a flow chart for performing the index printing shown in FIG. 12. Here, the same steps as those in FIG. 4 are given the same reference numerals and description thereof is omitted. At S4, the reduced-size images 33 are placed at predetermined positions on the printing page and the procedure proceeds to 37a. At S7a, it is determined whether m pages of reduced-size images 33 or all reduced-size images 33 contained in the file have been placed. In the case of Yes at S7a, the procedure proceeds to S5. In the case of No at S7a, the procedure returns to S3. By repeating the processing at S3 to S4a, the reduced-size images 33 are placed in line abreast. At S5, it is determined whether or not all of the reduced-size images 33 contained in all of the files have been placed on the corresponding paper 30. In the case of Yes at S5, the procedure proceeds to S6 and printing is performed.

Next, the index display shown in FIG. 14 will be described. Here, the reduced-size images 33 of a plurality of pages contained in the file are displayed on the display unit 24 by the number of page numbers which can be displayed on one screen (m×n at the maximum). When the user instructs index display, first, as shown in FIG. 14A, P1, P2 of the file 1 and P1 of the file 2 are displayed. When the scroll button 34 is pressed to the right in this state, P1 to P4 of the file 3 is displayed as shown in FIG. 14B. When the scroll button 34 is further pressed to the right in this state, P1 of the file 4 is displayed as shown in FIG. 14C. That is, P5 of the file 3 that does not fall within one screen is not displayed. Thus, for example, when the file 3 contains several tens of pages, the user need not scroll many times.

Figure 15:
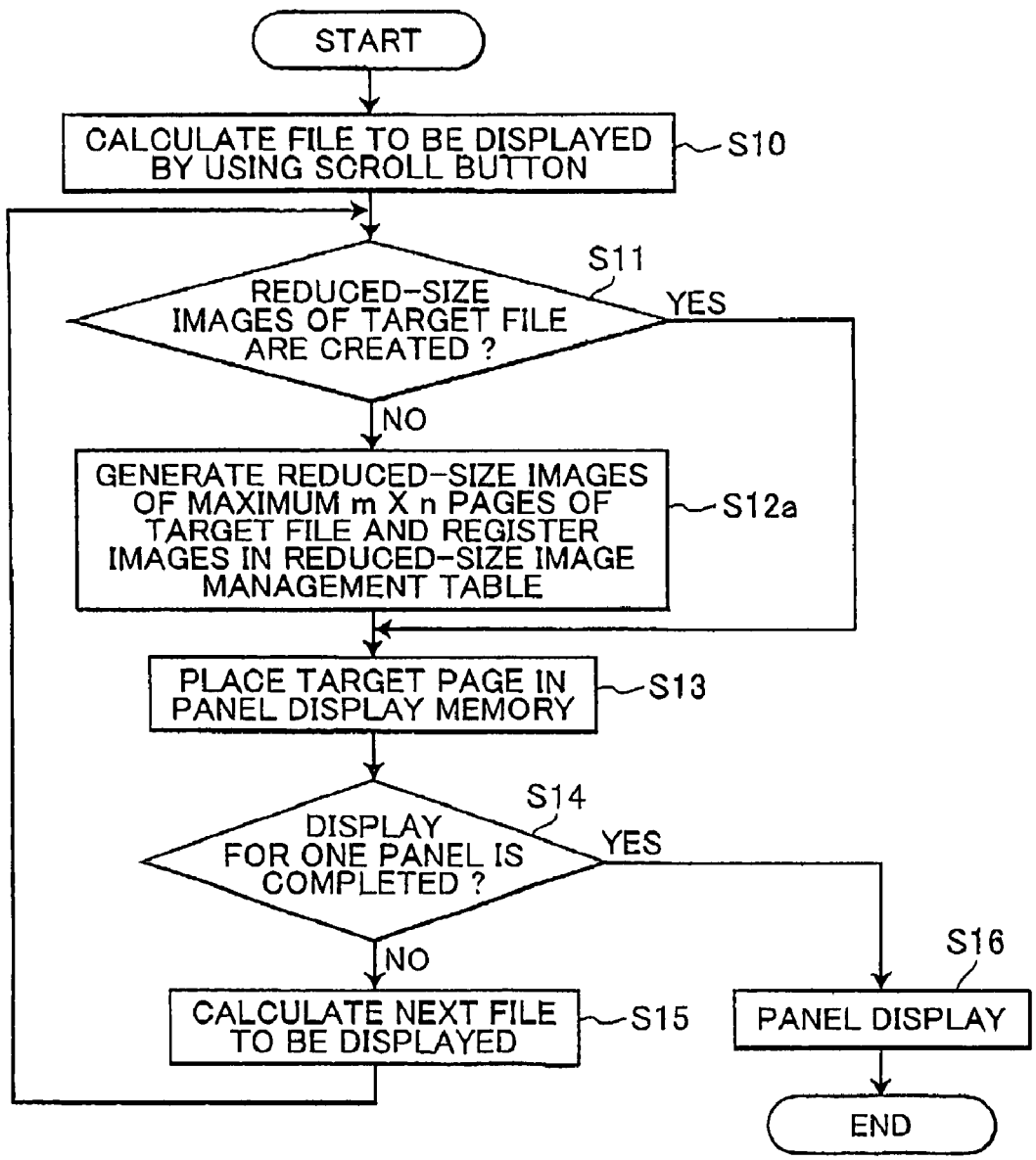
FIG. 15 is a flow chart showing the case where the index display shown in FIG. 14 is performed.

FIG. 15 is a flow chart for performing the index display shown in FIG. 14. First, at S10, by detecting pressing of the scroll button 34, the file to be displayed is calculated. The first screen may be displayed by pressing a button other than the scroll button. At S11, it is determined whether or not the reduced-size images 33 of the target file has been generated. In the case of Yes at S11, the procedure proceeds to S13. In the case of No at S11 the procedure proceeds to S12a. At S12a, m×n reduced-size images 33 of the target file are generated at a maximum and the generated reduced-size images 33 are registered in the reduced-size image management table. Since the reduced-size images from the leading page to the m×n page are selected by the placement page selecting program 12e. Thereby, the reduced-size images 33 which can be displayed on one screen are generated. At S13, the reduced-size images 33 are placed in the panel display memory. The same subsequent steps as those in FIG. 7 are given the same reference numerals and description thereof is omitted.

Figure 16:
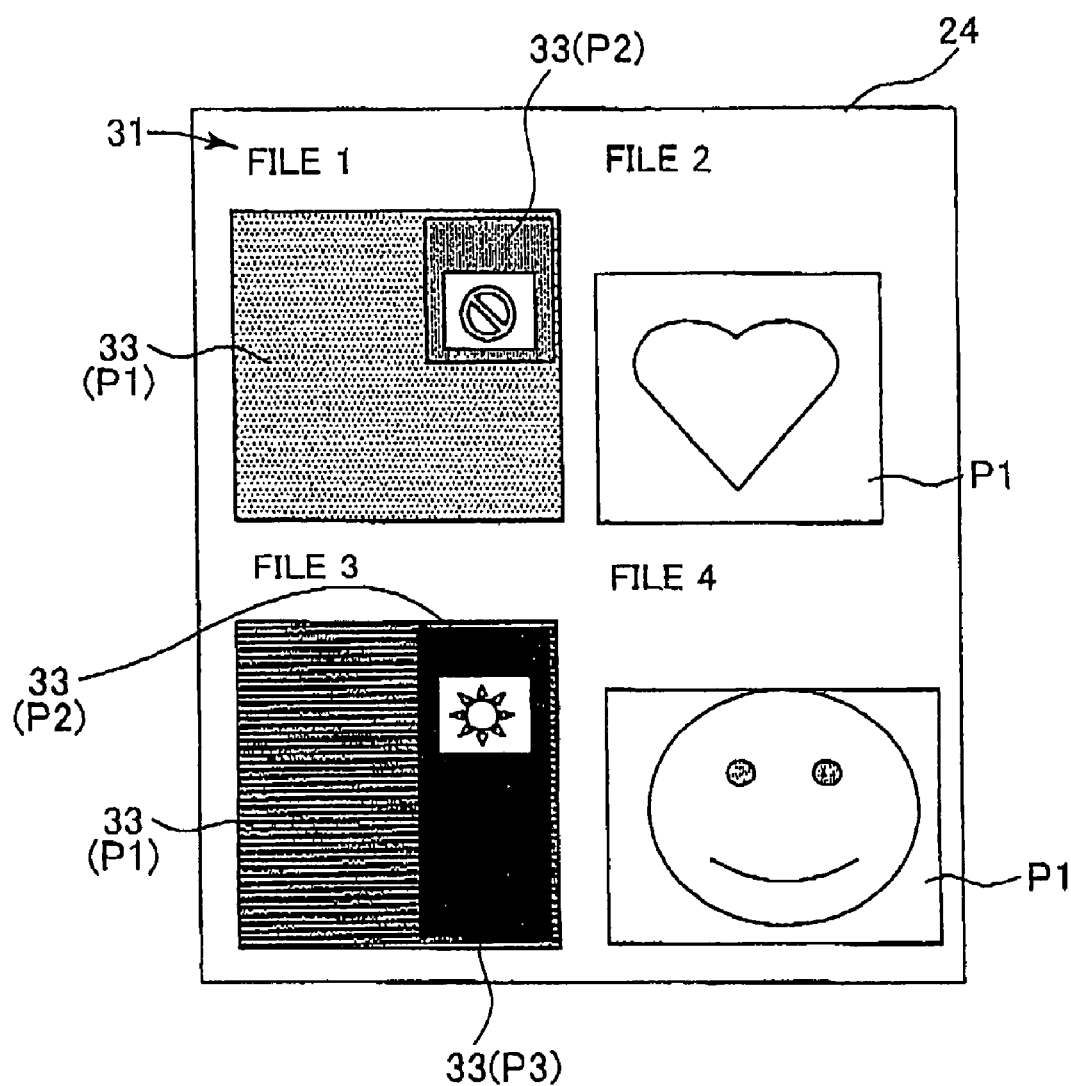
FIG. 16 shows another example of index display.

Next, an example of the index printing shown in FIG. 16 will be described. It is necessary to control the print position for placing a plurality of reduced-size images 33 on display, for example, the above-mentioned processing of assigning a row to one file. However, when the reduced-size images 33 of one file are superimposed on one display region, the above-mentioned control of print position becomes unnecessary. For example, as shown in FIG. 16, by superimposing the reduced-size image 33 of one page upon the reduced-size image 33 of another page, the reduced-size images contained in one file are displayed while using a region for only one reduced-size image. In FIG. 16, the reduced-size image 33 of P1 of the file 1 is placed under the reduced-size image 33 of P2 of the file 1. The reduced-size image 33 of P1 of the file 3 is placed under the reduced-size images 33 of P2 and P3 of the file 3. By displaying the reduced-size images 33 in this manner, index display effectively utilizing the display region can be achieved.

In FIG. 16, the lower reduced-size image 33 is displayed to be larger than the upper reduced-size image 33. Thus, the lower reduced-size image 33 is not completely hidden. For example, the upper reduced-size images 33 of 21 of the file 3 and P2 can be completely seen and a left half of the lower unhidden reduced-size image 33 can be seen. Thus, contents of these reduced-size images 33 can be grasped.

The lower reduced-size image 33 may be made visible through the upper reduced-size image 33. In this case, contents of the upper reduced-size image 33 and the lower reduced-size image 33 can be readily recognized.

Alternately, a background region may be distinguished from the other region (for example, a region where a FIG. is drawn) in the lower reduced-size image 33 and the upper reduced-size image 33 may be placed on the background region. Thus, the region containing a figure and the like, of the lower reduced-size image 33, is not hidden. For example, a region in which the same color is continuously used can be determined as the background region, and a region in which the same color is not continuously used can be determined as the non-background region.

Figure 17:
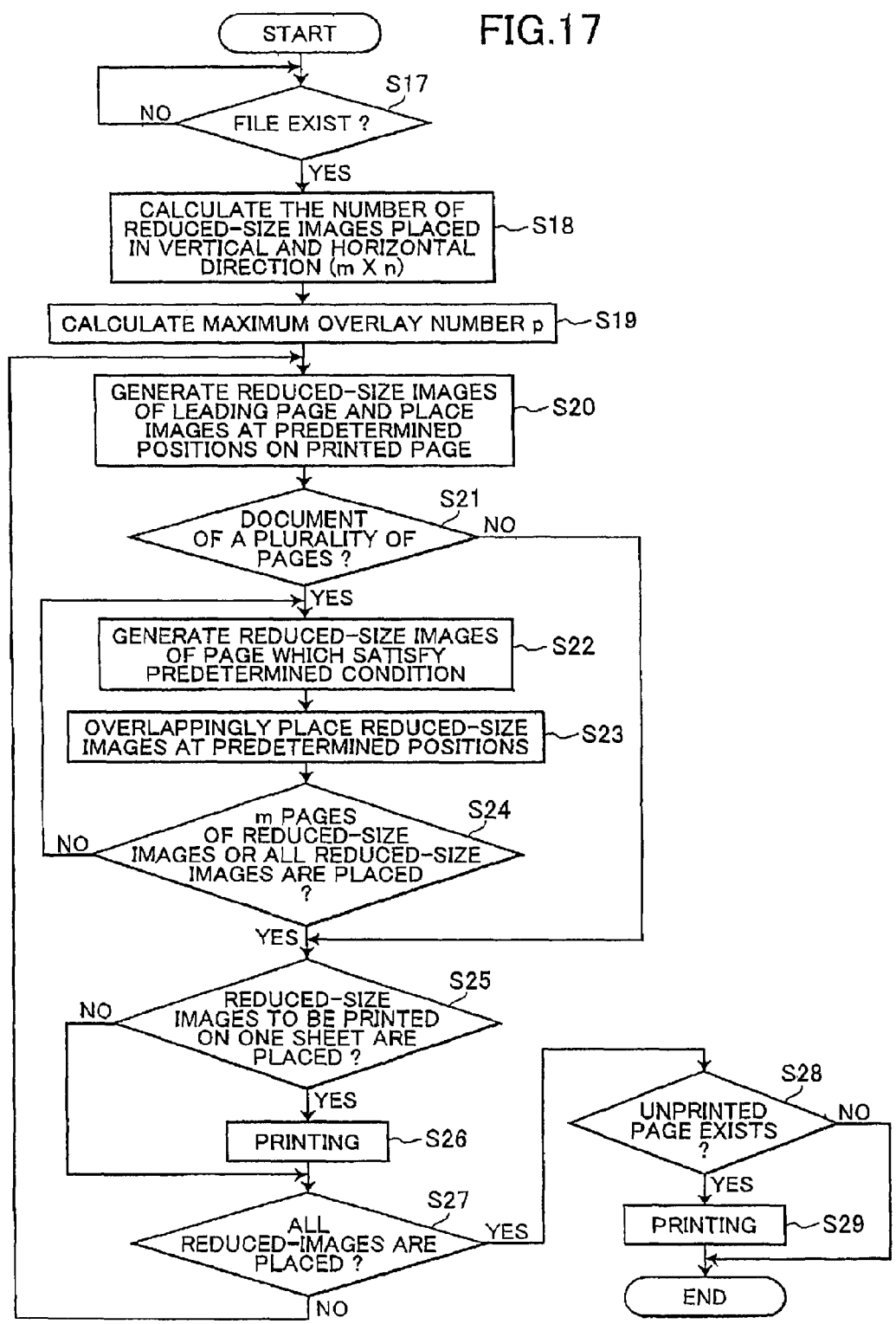
FIG. 17 is a flow chart showing the case of overlay index printing.

FIG. 17 is a flow chart for performing the index display shown in FIG. 16. When the user performs an input operation for performing the index printing, the flow chart is started and processing at S17 is executed. After the number of the reduced-size images 33 in the vertical and horizontal directions (m×n) has been calculated on the basis of the reduced-size image 33 and the size of the paper 30 at S18, the procedure proceeds to S19 to calculate a maximum overlay number p. In the example shown in FIG. 16, the maximum overlay number p is 2. Then, at S20, the reduced-size image 33 of the leading page is generated and placed at a predetermined position of a printed page. After that, the procedure proceeds to S21 and it is determined whether or not a plurality of pages is contained in the target file. In the case of Yes at S21, the procedure proceeds to S22. In the case of No at S21, the procedure proceeds to S25.

At S22, the placement page selecting program 12e selects the files that satisfy a predetermined condition for narrowing down the files to be displayed so that the user may easily recognize contents of the files, and the reduced-size image generating program 12b generates the reduced-size images 33 of the selected pages. In the present embodiment, a colored page or a page containing a figure (image) corresponds to the page which satisfies the predetermined condition. Then, at S23, the reduced-size images 33 are overlappingly placed at the predetermined position by the overlay output program 12f. In this case, as shown in FIG. 16, the selected reduced-size image 33 may be placed on the right with respect to the lower reduced-size image 33 or may be placed on the background region as described above. At S24, it is determined whether m reduced-size images 33 or all reduced-size images 33 are placed at corresponding predetermined positions. In the case of No at S24, the procedure returns to S22. In the case of Yes at S24, the procedure proceeds to S25. At S25, it is determined whether or not the reduced-size image 33 for one printed page has been placed. In the case of Yes at S25, the procedure proceeds to S26 and printing is started. Then, at S27, it is determined whether or not all of the reduced-size images 33 contained in all of the files have been placed on the corresponding paper 30. In the case of No at S25, the procedure also proceeds to S27 without performing printing at S26. In the case of No at 527, the procedure proceeds to S20 for placing all of the reduced-size images 33 contained in all of the files on the corresponding papers 30. In the case of Yes at S27, it is determined whether or not the unprinted reduced-size image 33 exists at S28. In the case of Yes at S28, the procedure proceeds to S29 and printing is started. In the case of No at S28, the procedure is finished.

Figure 18:
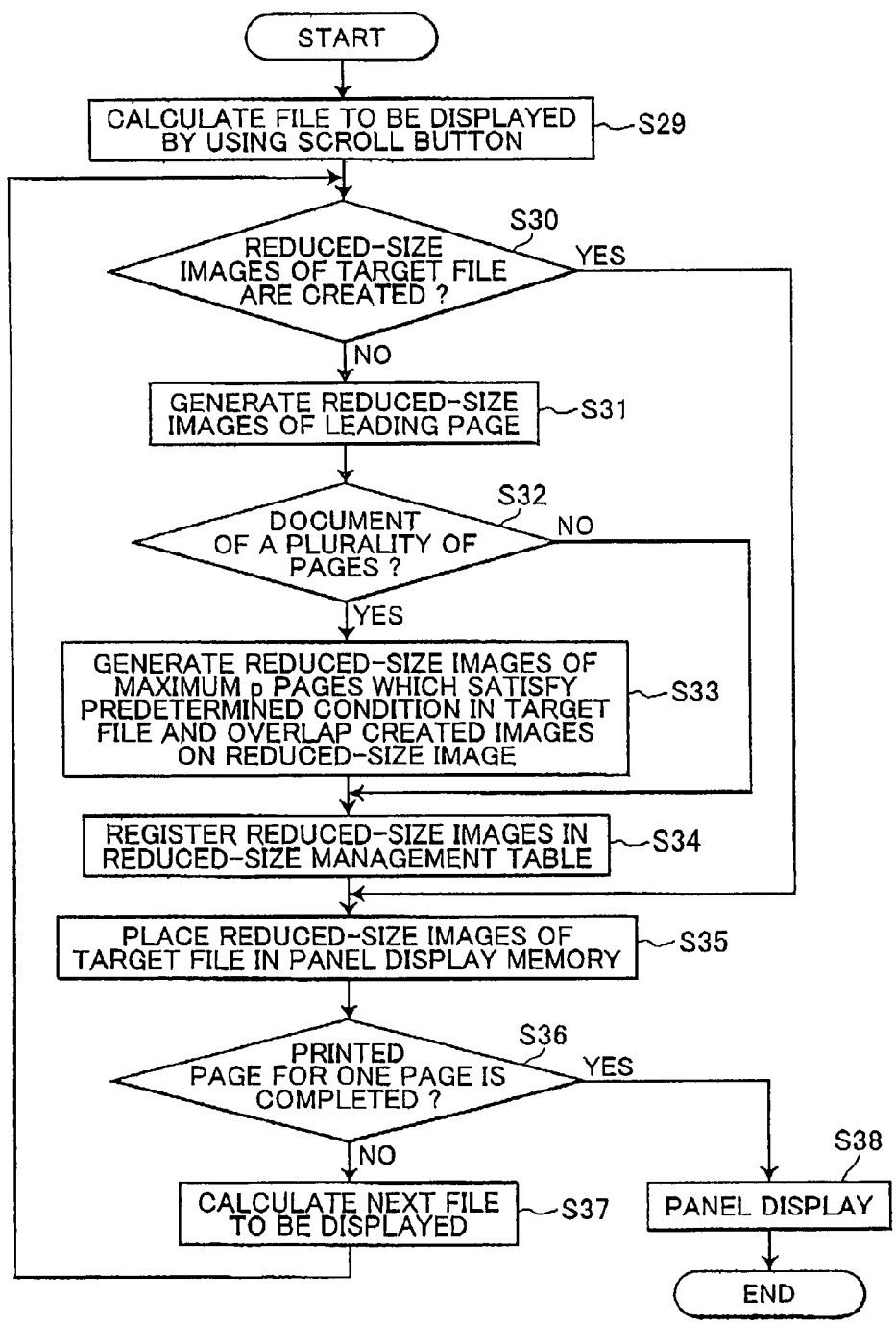
FIG. 18 is a flow chart showing the case of overlay index display.

Next, FIG. 18 is a flow chart for performing index display. First, at S29, by detecting pressing of the scroll button 34, the file to be displayed is calculated. The first screen may be displayed by pressing a button other than the scroll button. Then, the procedure proceeds to S30 and it is determined whether or not the reduced-size images 33 of the target file has been generated. In the case of Yes at S30, the procedure proceeds to S35. In the case of No at S30, the procedure proceeds to S31. At S31, the reduced-size image 33 of the leading page is generated. After that, the procedure proceeds to S32 and it is determined whether or not the target file contains a plurality of pages. In the case of Yes at S32, the procedure proceeds to S33. In the case of No at S32, the procedure proceeds to S34. At S33, p maximum pages (for example, two pages) that satisfy a predetermined condition are selected from the target file by the placement page selecting program 12e and the reduced-size images 33 of the selected pages are generated by the reduced-size image generating program 12b. The reduced-size images 33 are overlapped on the reduced-size image of the leading page by the overlay output program 12f. Then, the procedure proceeds to S34 and the reduced-size images 33 are registered in the reduced-size image management table (a part of the storage area of the RAM 11 is used). At S35, the reduced-size images 33 of the target file are placed on the panel display memory. Then, the procedure proceeds to S36 and it is determined whether or not the placement of the reduced-size images 33 used per display has been finished. In the case of Yes at S36, display is performed. In the case of No at S36, the procedure proceeds to S37 and the next file to be displayed is calculated.

As described above, the compound machine 1 in accordance with this embodiment prints or displays the reduced-size images of a plurality of pages, in the case of documents of a plurality of pages, especially, documents having the repetitive first page and documents mainly containing characters. Accordingly, the user can recognize contents of the file easily.

While the invention has been described in detail with reference to the specific embodiment thereof, it would be apparent to those skilled in the art that various changes and modifications may be made therein without departing from the spirit of the invention.

What is claimed is:

1. An information processing device comprising a processor configured, when executing computer readable instruction, to provide:
    an acquiring unit configured to acquire at least two files including a first file and a second file, each of the two files defining at least one page containing at least one of character and image, and the second file defining a plurality of pages;
    a reducing unit configured to generate a first reduced-size page from a page of the first file and two or more second reduced-size pages from the plurality of pages of the second file; and
    an outputting unit configured to output the first reduced-size page and the two or more second reduced-size pages, such that the first reduced-size page and the two or more second reduced-size pages are placed at consecutive positions on an output medium having "n" row× "m" column of regions on which reduced-size pages can be placed, wherein:
    the reducing unit generates "k" number of reduced-size pages from pages of a file having the "k" number of pages, if the "k" is smaller than or equal to the "m",
    the reducing unit generates the "m" number of reduced-size pages from pages of a file having the "k" number of pages, if the "k" is larger than the "m", and
    the outputting unit outputs reduced-size pages generated from pages of one file on a first row of the output medium and reduced-size pages generated from pages of another file on a second row different from the first row.

2. The information processing device according to claim 1, wherein the first file has only one page, and the outputting unit outputs the first reduced-size page at a first position on the output medium, and outputs the second reduced-size pages at a second position of the output medium.

3. The information processing device according to claim 1, further comprising a selecting unit configured to select two or more pages from among the plurality of pages of the second file, a number of the selected two or more pages being determined to be arranged within the output medium in a predetermined direction at maximum,
    wherein the reducing unit generates the two or more second reduced-size pages from the selected two or more pages.

4. The information processing device according to claim 3, wherein the selecting unit selects two or more pages that satisfy a predetermined condition from among the plurality of pages of the second file.

5. The formation processing device according to claim 4, wherein the selecting unit sequentially selects two or more pages, from a leading page, from among the plurality of pages of the second file.

6. The information processing device according to claim 4, wherein the selecting unit selects two or more color pages from among the plurality of pages of the second file.

7. The information processing device according to claim 4, wherein the selecting unit selects two or more pages each including an image from among the plurality of pages of the second file.

8. The information processing device according to claim 1, wherein the outputting unit is further configured to partially superimpose the second reduced-size pages.

9. The information processing device according to claim 8, further comprising a selecting unit configured to select two or more pages that satisfy a predetermined condition from among the plurality of pages of the second file.

10. The information processing device according to claim 9, wherein the selecting unit selects two or more color pages from among the plurality of pages of the second file.

11. The information processing device according to claim 9, wherein the selecting unit selects two or more pages each including an image from among the plurality of pages of the second file.

12. The information processing device according to claim 8, wherein the outputting unit outputs the second reduced-size pages so that one second reduced-size page is seen through another second reduced-size page.

13. The information processing device according to claim 8, wherein the outputting unit partially superimposes one second reduced-size page on another second reduced-size page larger than the one second reduced-size page.

14. The information processing device according to claim 8, further comprising a discriminating unit configured to discriminate a background region of one second reduced-size page from a foreground region of the one second reduced-size page, wherein the outputting unit places another second reduced-size page on the background region of the one second reduced-size page.

15. The information processing device according to claim 1, wherein the outputting unit outputs a file name with respect to each file on the output medium.

16. The information processing device according to claim 1, wherein the outputting unit outputs a page number with respect to each page on the output medium.

17. The information processing device according to claim 1, wherein the outputting unit prints the first reduced-size page and the second reduced-size pages on a recording medium.

18. The information processing device according to claim 1, further comprising a display on which the outputting unit displays the first reduced-size page and the second reduced-size pages.

* * * * *